US008175990B1

(12) United States Patent  (10) Patent No.: US 8,175,990 B1
Hodjat et al.  (45) Date of Patent: May 8, 2012

(54) SITUATIONAL DECISION ENGINE AND METHOD FOR CONTEXTUAL USER EXPERIENCE

(75) Inventors: Babak Hodjat, Dublin, CA (US);
Parmeet Chaddha, Fremont, CA (US);
Siamak Hodjat, San Jose, CA (US)

(73) Assignee: ILoop Mobile, Inc., San Jose, CA (US)

( * ) Notice: Subject to any disclaimer, the term of this patent is extended or adjusted under 35 U.S.C. 154(b) by 1161 days.

(21) Appl. No.: 11/969,813

(22) Filed: Jan. 4, 2008

Related U.S. Application Data

(60) Provisional application No. 60/878,522, filed on Jan. 4, 2007.

(51) Int. Cl.
*G06F 17/00* (2006.01)
*G06N 5/00* (2006.01)
(52) U.S. Cl. ................. 706/45; 706/12; 706/62
(58) Field of Classification Search .............. None
See application file for complete search history.

(56) References Cited

U.S. PATENT DOCUMENTS

| 5,740,035 | A | 4/1998 | Cohen et al. | |
| 7,571,110 | B2 | 8/2009 | Tarr et al. | |
| 7,574,661 | B2 * | 8/2009 | Matsuura et al. | 715/745 |
| 7,818,208 | B1 * | 10/2010 | Veach | 705/14.49 |
| 2001/0051876 | A1 * | 12/2001 | Seigel et al. | 705/1 |
| 2002/0128908 | A1 | 9/2002 | Levin et al. | |
| 2003/0065805 | A1 * | 4/2003 | Barnes, Jr. | 709/231 |
| 2004/0153373 | A1 * | 8/2004 | Song et al. | 705/26 |
| 2006/0080321 | A1 * | 4/2006 | Horn et al. | 707/10 |
| 2006/0190331 | A1 * | 8/2006 | Tollinger et al. | 705/14 |

OTHER PUBLICATIONS

Office Action for U.S. Appl. No. 11/969,864 dated May 12, 2011, 9 pgs.
Chaddha, U.S. Appl. No. 11/969,864, Office Action dated Dec. 22, 2011, 8 pgs.

* cited by examiner

*Primary Examiner* — Jeffrey A Gaffin
*Assistant Examiner* — Adrian Kennedy
(74) *Attorney, Agent, or Firm* — Morgan, Lewis & Bockius LLP

(57) ABSTRACT

A situational decision engine (SDE) operates within a mobile device or server to present a user with display content specifically optimized to the user's present situation. By acquiring characteristics about the user's present situation, the SDE is capable of analyzing the general state of the user and make decisions about presenting information with situational relevance. With the SDE, promoters and marketing firms may target user incentives and present the incentives based on a correlation of incentive features and the users context. After acquiring key characteristics of a user's context, the SDE analyzes and determines an optimal correlation to available incentives. By optimizing the matching of a promotion, an ad, or a survey to the user's situation, maximum benefit to both user and the promoter may be realized. By analyzing a user's context and presenting display content accordingly, the SDE is able to optimize the user's experience.

9 Claims, 3 Drawing Sheets

SITUATIONAL DECISION ENGINE AND METHOD FOR CONTEXTUAL USER EXPERIENCE

CROSS-REFERENCES TO RELATED APPLICATIONS

The present application claims benefit under 35 USC 119 (e) of U.S. Provisional Application No. 60/878,522, filed on Jan. 4, 2007, entitled "Situational Decision Engine for Contextual Messaging on Mobile Devices," the content of which is incorporated herein by reference in its entirety.

BACKGROUND OF THE INVENTION

The present invention relates to methods of providing information on mobile devices, and more particularly to providing that information based on the context of a user's general state.

Mobile devices have become prevalent and play an important part in peoples' lives each day. A corresponding prevalence of wireless connectivity allows the availability of a great deal of information to the mobile device user. Typically, the mobile device user has been provided with an interface produced on a device display where a particular representation of general information is rendered. The World Wide Web and Web browsers are typical elements of this interface. The information provided are primarily a product of how the user has configured their interface and how they decided to navigate the Web with the interface. The user is responsible for knowing about- or navigating to sources of information that are useful. A user's general situation and their environment are not typically taken into account for directing what information is made available to them. With the prevalence of mobile devices and wireless connections to the Web it would be highly desirable for a user to have their surroundings and general situation taken into account as a basis for providing information. It would be further desirable for promoters of sales or marketing incentives to be able to provide information about sales or promotions to mobile device users in a context most likely to relate to their needs.

BRIEF SUMMARY OF THE INVENTION

The present invention is realized in one embodiment as a situational decision engine (SDE) architecture. The SDE is operable as a component within a mobile device or a server. The core of the SDE includes a context system and a scenario system that capture essential characteristics of a users situation and make decisions about content to be delivered to a mobile device display based on analysis of the users general state in their environment. The SDE also includes a user interface, an alerting system, an incentive system and a user contribution and profile system. These systems retain information about a user's present situation, a history of their previous situations, the general context surrounding transitions from one situation to another, and incentives for purchases or other interactions with the user's environment. The SDE takes into account present context in addition to additional situational information and makes a decision on a most relevant content to be provided to the mobile device display. In this way the SDE is able to take into account the users situation and relate information available to them by their wireless connection to the web and provide situational relevant information to improve their experience.

DETAILED DESCRIPTION OF THE INVENTION

Figure 1:
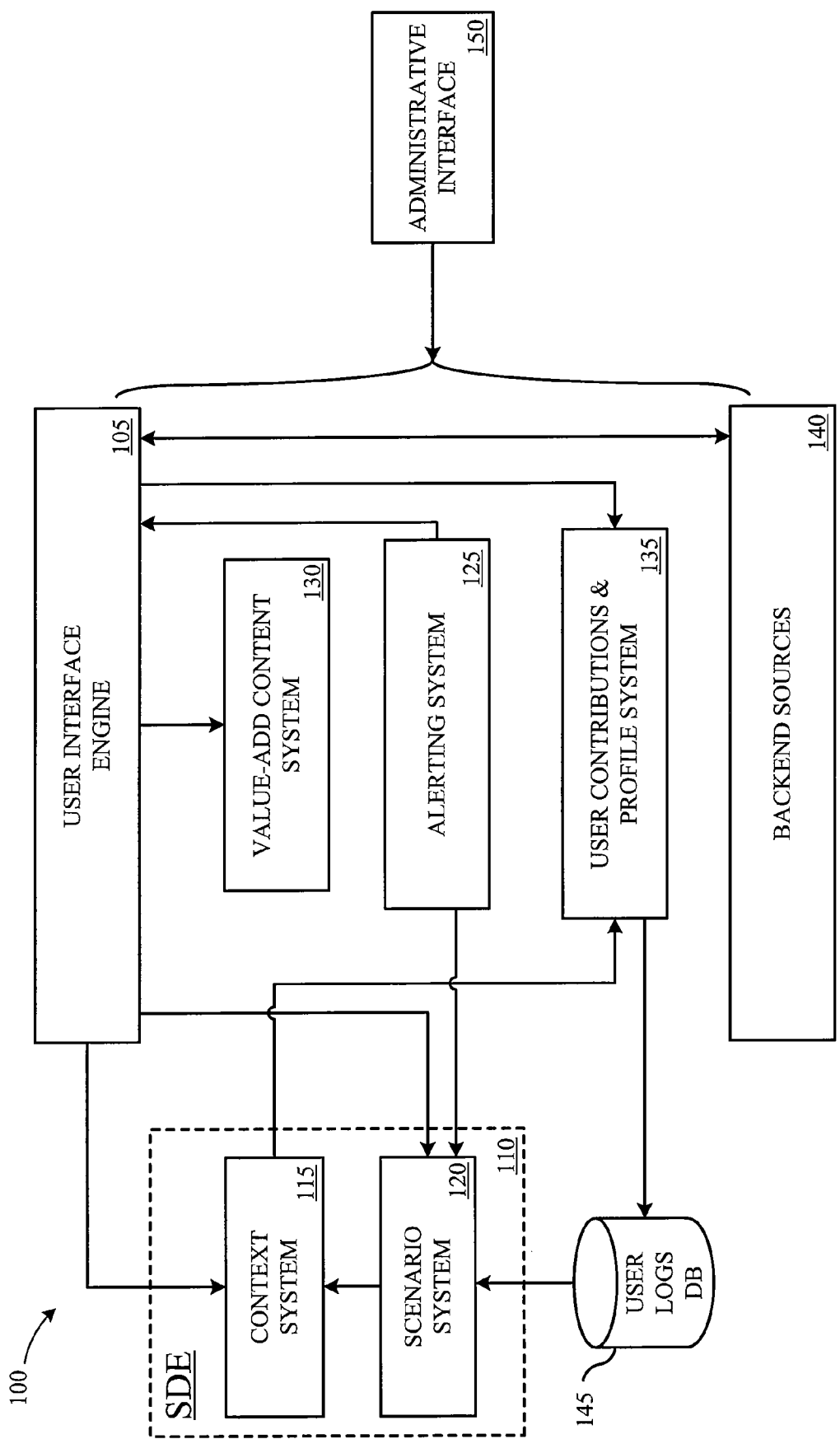
FIG. 1 is a block diagram of a mobile device including an embodiment of the present invention.

The prevalence of mobile devices, the ever-expanding presence of wireless connections, and the vast quantities of information available over the worldwide web mean that a significant opportunity exists for a mobile device user to have access to this information while they navigate their world. With this situation comes a previously unrealized opportunity for correlating the information displayed to the mobile device user with their environment. Significant value may be derived by a user from taking advantage of an awareness of the user's environment and being provided with information relating to the user's situation. Accordingly; marketing, promotional, and transactional inducements may be provided to a user based on the user's general state and provide significant benefits to both the user and a promoter or a service provider. Since these benefits may now be provided "in-the-moment," their value may be more keenly appreciated by all parties involved. This is due to a match of the situation to mutual interests, an inherent timeliness of delivery, and likelihood of each party benefiting from a resulting transaction.

In the present exemplary embodiment, the mobile device is in wireless communication with the worldwide web, and provides the user with situational-relevant information. The mobile device may also contribute to capturing situational characteristics from direct user input or onboard systems. For instance many mobile devices either today do- or in the future will include a global positioning system (GPS), radio frequency ID (RFID), or some point of sale (POS) scanning ability. From such onboard systems a user's position, time of day, temperature, or other environmental information may be derived. Some information about the user may be directly determined, such as a user's position from the GPS. Other user information may be indirectly determined, such as, concluding the user must be outdoors since their position indicates their being in the middle of a plaza or square.

The mobile device may also take a direct input from the user where display content provides interaction with the user to capture some characteristic about the user's environment. The mobile device may be capable of capturing additional information which may include inferences based on information input directly by the user or obtained indirectly as mentioned above. Inferences are deduced from other information and may include deductions such as whether the user is hungry, tired, lost, or may want to find a particular item. For instance if the user is at a known location (available by GPS) and it is raining (available from online weather report) and near a certain shopping mall (known from geographical mapping or online yellow pages), the mobile device may deduce that the user may want to find an umbrella.

An SDE, according to one exemplary embodiment, operates within the mobile device. Alternately, the SDE may execute on a server and be in electrical communication with a mobile device. The SDE may be realized as a combination of applications, utilities, and applets executing on a processor element within the mobile device or on a server in communication with the mobile device. The SDE may process a user's situational characteristics for an understanding of those characteristics in relation to the users present general state and possible future situations. The SDE may analyze the present situation, compare the situation to stored situations, identify the likelihood of some incentive to trigger a given next situation. Analysis by the SDE may determine the presentation of content and incentives provided by a promoter. The SDE may be used to provide a probability of a given incentive to trigger the user's decision to navigate to a target situation. The SDE has access to resources such as those available online, or to local resources such as memory for storing or logging information relating to the user and their situational history. The SDE may also gain access to information provided by a promoter or marketing entity. This information may directly relate to incentives provided after a user's trigger in a particular situation.

Content is the information presented to a user of a mobile device. Content is typically presented to the user on the display of the mobile device. In one exemplary embodiment, content may be provided with situational appropriateness. That is, the information presented as content is derived from an awareness of the user's situation. Information presented in a present or next-selected content is deemed to be appropriate to the user based on their present situation. Through an awareness of the user's situation, information provided may help the user in navigating through the content or their physical environment.

One part of content may be incentives or inducements. These incentives may include coupons, discounts, or other offerings for a transaction or an inducement to participate in some other situation. For instance when a user is present in close proximity to a downtown shopping area a marketing survey may be offered as part of the user's content and discount coupons from nearby stores offered as the incentive to take the survey. A promoter or marketing entity may use content to persuade the user to choose a particular sales event or to shop at a sponsoring store. Content may be thought of as display information directed to induce a user to decide on navigating to a target situation.

Producing the particular relationships between users situations and corresponding content to be displayed is called mapping. Mapping is identifying the relationship and benefit of delivering content or a particular element as a portion of content based on a user's situation. By analyzing the characteristics of a situation, a correlation of a certain characteristic with aspects of promotional incentives may be evaluated. A set of correlation parameters may be defined by a producer of an incentive. The incentive correlation parameters may be a numerical representation of how closely a characteristic of a present situation is to be to a promotional incentive in order to register a match. The number and the magnitude of situational characteristics in a matching condition (as measured by the correlation parameters) indicates a relative strength of the match to the promotional incentive. If a certain set of characteristics for some users situation has a higher correlation with a first incentive than another incentive, the higher degree of correlation gives the first incentive a greater valuation and greater likelihood of being included in the next content displayed.

Mapping may be rule-based where a predetermined set of rules is used to form a portion of the content by recognizing a particular set of characteristics of a users situation and correlating them to particular content elements. By analyzing and recognizing a particular set of characteristics from a users situation a rule may be referenced to further evaluate the correspondence of those characteristics with an available incentive. The rule may in fact be a logical assertion that if a first characteristic and a second characteristic are present and a third characteristic is not, then trigger a particular promotion.

Mapping may be probabilistic in that characteristics of a present situation may be used in an expression or analyzed to determine the likelihood or probability of a user deciding for a particular next situation. Characteristics from a users present situation may be applied to a probabilistic expression and evaluated for the likelihood of the user to enter a particular next situation. If different sets of characteristics produce corresponding likelihoods for a user to trigger a given set of next situations, the SDE may use the higher likelihoods evaluated in determining the next content for the user. The historical information about other users decisions when experiencing a particular set of characteristics may be available from logs or databases and used as part of the probabilistic evaluation. In other cases, a particular set of conditions may have such a low likelihood that they in effect indicate a user is unlikely to enter a particular next situation. This form of probability analysis may be used to inhibit the selection of particular elements of content. In the practice of mapping, assessing the degree of correlation between an incentive and a particular situation produces a key aspect of situational awareness.

A users situation is the general state of things around them. A situation may also be used in describing the degree of correspondence of a user with a general state. In other words, the general state of a user corresponds to a situation. The correspondence between a user's general state and a situation may be described by a set of characteristics. A situation is, for example, the set of characteristics that describe essential features of the user's position in relation to their surroundings. A notion of association between the user's real-world state and relevant display content exists by how situational characteristics are chosen and correlated with their general state (i.e., with mapping, as described above). The users situation corresponds to their general surroundings by the degree that the characteristics of the situation correlate with and describe the user's general surroundings.

A situation may include descriptive characteristics that are known, predicted, or produced. A known characteristic in a situation may be ascertained by the mobile device, such as location coordinates from a GPS. Predicted characteristics may come from an algorithm or a statistical package that produces an evaluation of the likelihood of a characteristic given other known characteristics in a situation. For instance, a user's location may be derived from the mobile device and GPS, a weather forecast may be accessible from the worldwide web, and the time and date are known and therefore it may deduce that the user is in the rain. A produced characteristic is exemplified by the incentives where, for instance, an ad may be included in content presented to the user and therefore becomes a characteristic of the user's situation.

Additionally, a situation has context. A situation itself may be thought as a context of the user. For purposes of the present exemplary embodiment, context is a description of the characteristics surrounding a situation.

A scenario is a set of situations and a corresponding set of transitions between them. A scenario may contain a projected sequence of situations where the situations may be expected by their general association with each other and, for example, their sequence may be predicted by a statistical package (mentioned previously) or expressly designed by knowledge engineers. A scenario may include a user's actual situations and transitions which are produced by information collected from a log of the users behavior. Scenarios of either type or of a mixture of the actual or projected situations and transitions may be available to the SDE for use in presenting content to the user.

Reaching a particular situation within a scenario may bring about the possibility of multiple choices by a user in deciding for a next situation. Each unique set of transitions between corresponding situations or potential situations may be considered a scenario. Due to the possibility of a single situation belonging to multiple scenarios, scenarios may be thought of overlapping or intersecting. A set of closely related scenarios may intersect, diverge, and intersect again at a later situation and repeat this pattern with any number of other scenarios. Scenarios, situations, and corresponding transitions are a way of describing the users general situation and their navigation through their world.

Generally, a trigger is an act that sets in motion some course of events. In the present embodiment, a trigger is, for example, the user selecting a particular element of content in a present situation and the SDE within the mobile device providing a new situation and content. For instance, the user may select the display for further information, such as news and events. Alternately, the user may select a link to an incentive such as the details to a discount coupon or the link to participate in a particular survey. The user's selection of a portion of the present content triggers navigation to a next situation. From this transition between situations some portion of a scenario is taken. Each selection of a content element is a trigger and forms a next navigational step.

A trigger may also be produced by the SDE. As noted above, the SDE may be involved in presentation of a new situation on the mobile device. Additionally, the SDE may recognize both a particular context and corresponding likelihood of an incentive being taken by the user. The SDE may therefore trigger presentation of a new content and display the content to the user. By recognizing a particular situation and by having a corresponding rule or having performed a corresponding analysis, the SDE triggers presentation of the new content. The SDE is especially prone to include situational-appropriate incentives as part of the newly selected content.

With reference to FIG. 1, a user interface (UI) engine 105 is coupled to an SDE 110 in an exemplary embodiment of a situational decision engine within a mobile device 100. The SDE 110 includes a context system 115 and a scenario system 120. The SDE 110 further couples to an alerting system 125, a value-add content system 130, and user contributions and profile system 135. The UI engine generates a user device interface through use of graphical representation means (e.g., HTML, xHTML, WML, SMS, MMS, J2ME etc.). The UI engine also couples to back-end sources. Backend sources 140 include applications and content sources (e.g., maps, directions, points of interest, restaurants, bars, hotels, weather, traffic, etc.). A user logs DB 145 couples to the scenario system 120 and the user contributions and profile system 135. The SDE 110 system is coupled with an administrative (admin) interface 150 which may be used by, for example, administrators, merchants, and content publishers.

The architecture of the SDE 110 constitutes the context system 115 and the scenario system 120 and is situated in conjunction with other subsystems necessary for providing data service to users. The core SDE 110 enables situational decisions leading to highly relevant content for delivery to the users.

The UI engine is Responsible for interacting with the user and the user device. The UI engine can determine such contextual elements as the location of the user, the date and time of day, and the last interface action by the user (e.g., text or GUI). The UI engine can display the state of the user device (e.g., ringing, quiet mode, standby etc.) and the user's explicit feedback in a situation (e.g., a rating of the appropriateness of an offered service).

The UI Engine is driven by the scenario system 120 (discussed later) which determines the flow of the UI. The UI engine determines the user interface flow through UI elements, such as advertisements, which are presented as incentives on each page.

The alerting system 125 is responsible for maintaining a list of alerts along with corresponding alert trigger rules. The alerting system 125 can determine alerts that are appropriate for the user given the current situation.

The value-add content system 130 stores various types of incentives, such as coupons, ads, point system tallies, and cash programs. The incentive program(s) are associated to current content and applications being served to the user by appropriateness and degree of relevance with the user's current situation. The resulting correlation indicates a monetization of relevant content and applications for the purposes of a business model. Ads, Coupons and other types of incentives, as well as corresponding trigger rules, are introduced into the system and administered through the admin interface 150.

The user contribution and profile system captures user contributions to the system and tags the contributions with a corresponding representation of the context when captured.

The user contribution and profile system stores user content contributions as well as tracks user activity for future analysis and profiling.

The pages in the user interface include fixed items and placeholder elements, enabled by various presentation and logic rules. The fixed items are UI elements defined during the composition of the page in the admin interface 150 and may include images, text, hyperlinks, forms (e.g., including edit fields, listboxes, dropdown listboxes, multiline edit fields), and buttons (push, radio, checkbox). The placement, logic and presentation of such fixed items are explicitly defined during page composition. In contrast, the placeholder elements are placed on the page without defining the actual content of the elements. The UI engine collaborates with the scenario system 120 to change the content of placeholder elements, based on the given situation. The presentation and logic rules for the placeholder elements may be predefined from the admin interface 150 or determined automatically by the UI Engine based on the given situation, as determined by the scenario system 120.

For instance, a page designed to eventually contain a list of travel destinations includes placeholders for the list, the advertisement or coupon to be displayed on the page, and navigational options for what is to be displayed as the next page. Fixed elements in the page include the layout, fixed commands on the list itself, and anchor navigational options present in every page such as 'help' and 'home'. Before a page is displayed, the UI Engine consults the scenario system 120 to determine values for the placeholder elements of the page based on the context.

Once the SDE 110 determines a current situation, the UI Engine is supplied with content, applications, alerts, ads, and coupons appropriate for the user. Content and applications are then accessed and presented to the user by the UI engine through the backend system, primarily using web services interface.

The UI engine also provides an ability to enforce various content transcoding rules so that content is rendered optimally on the mobile device. Transcoding rules take into account the form-factor of the mobile device and apply presentation properties accordingly. Such properties include font (type, size, style, color), background, pagination and (minimum) scrolling, form controls (e.g., fields, buttons), image, and data tables for example. For optimal content delivery performance, the UI engine manages the data cache.

The alerting system 125 supports three types of alerts. The supported alerts are either generated by the system, subscribed to by the user, or published by merchants. Based on the current situational context of a user, the SDE 110 determines actionable content of relevance for the user. The availability of such content is pushed to the user as a system alert. For instance, if a user is waiting for a taxi in rain and SDE 110 is aware of this situation then the SDE 110 system can alert the user with information about nearest store selling umbrellas.

Certain types of alerts are defined and may be subscribed to by the user. For instance, a user can define an alert for being updated on any type of content (e.g., movies, events, stock quotes). In defining such alerts, a user can specify the frequency and format. Each alert possesses unique metadata dictating presentation and behavior. Merchants using the admin interface 150 can define new types of content to be published to users. One example of those desiring to use the admin interface 150 in this way is a market research company publishing surveys to panel users. Availability of survey content is alerted to the user, based on the schedule specified by the publishing merchant.

The value-added content system handles content created by content publishers which is associated to the user based on situations, alerts, and published content. Examples include point-based incentive programs, cash incentive programs, coupon incentive programs, and mobile ads. A content publisher, such as a merchant, can define and maintain value-add content, tag the content with keywords, and associate the content to certain user situations and other published content. For instance, surveys are one example of such situations and associated published content that may be targeted through use of the admin interface 150.

The SDE 110 also tags user contributions to the system with a corresponding representation of the context of the contribution. The user contributions and profile system 135 stores user contributions such as multimedia, ratings, blog entries, and enables access by other users to these contributions. Entries are presented to users based on relevance of the content to the situation. The SDE 110 stores a history of user activity (e.g., navigation, content requests, decisions, and purchases) in the user logs DB 145. Historical information is used in the scenario system 120 to derive new scenarios and situation triggers. Lastly, the SDE 110 stores user personalization and preferences. User contributed content, user activity history, and preferences are used by the SDE 110 to construct and maintain a user profile. In addition to user scenarios, user profile is also used in determining the relevance of content to be delivered to the user.

Figure 2:
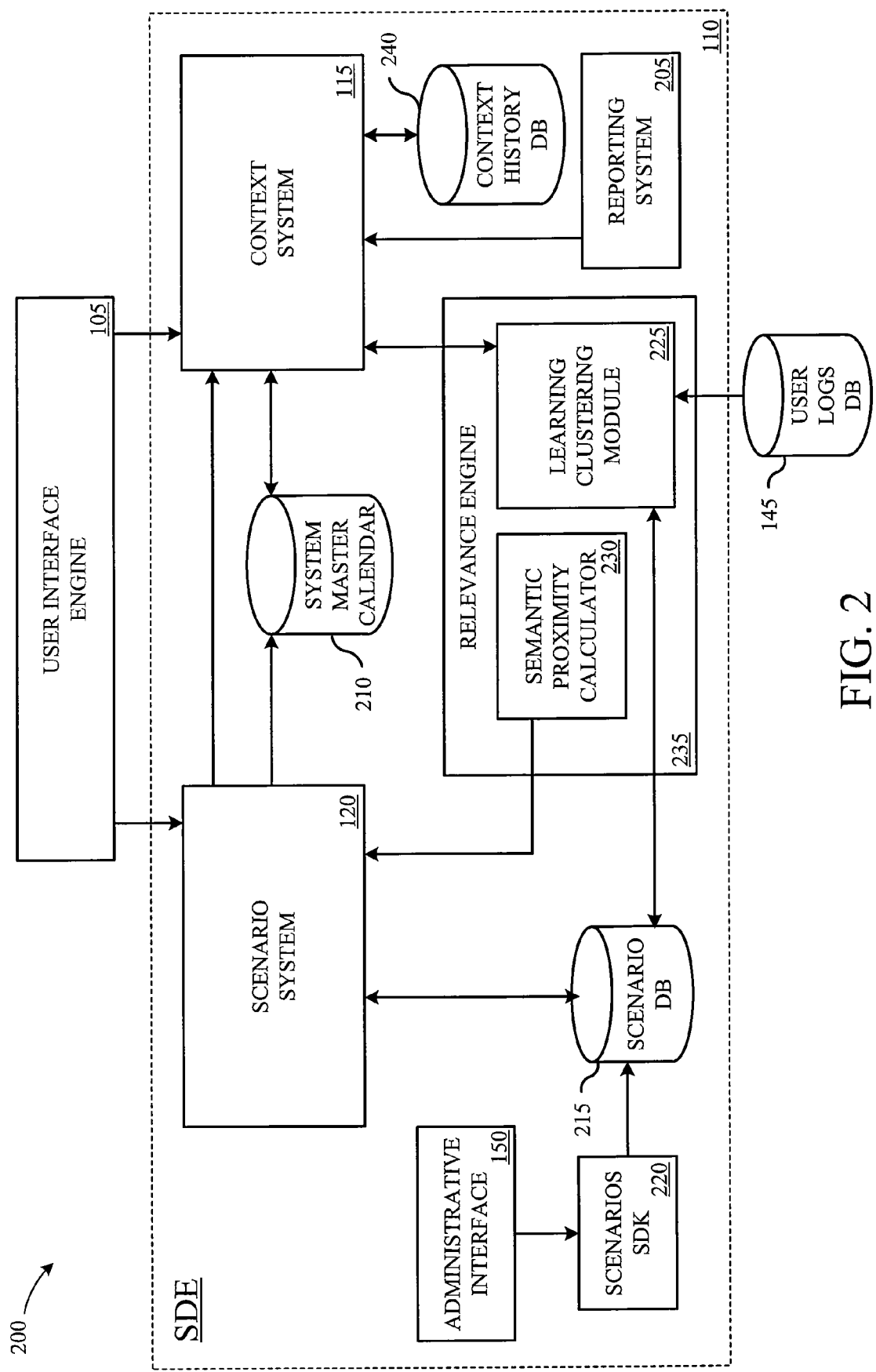
FIG. 2 is a block diagram of one embodiment of the present invention.

With reference to FIG. 2, the context system 115 acquires and maintains a current context within an exemplary embodiment of a situational decision system 200. The context is comprised of parameters such as current location, time, weather, calendar entry, and situation (from scenario system 120). The contextual parameters may be inferred based on information provided by the reporting system 205, system master calendar 210, and the UI engine. The reporting system 205, in collaboration with the context history DB 240 contributes by being responsible for keeping track of usage logs and providing a history of usage. The system master calendar 210 keeps track of appointments and user actions based on both implicit and explicit user behavior. The system master calendar 210 may also keep track of access to particular user calendar applications. The system master calendar 210 provides indications of the current user context based on entries within the calendar and the current time and date.

The UI engine, as discussed above, provides most recent user interactions with the mobile device as well as other contextual parameters such as location, time of day, user device state, user velocity, and Bluetooth or radio frequency ID (RFID) neighborhoods.

The scenario system 120 triggers scenarios based on input from the context system 115. At every given point in time, the context system 115 calculates the proximity of the current context to situation stored in the scenarios DB 215. The scenarios software design kit (SDK) 220 allows defining and editing of scenarios. The learning-clustering module 225 enables learning of new scenarios based on user behavior and context. The semantic proximity calculator 230 allows finding situations that are semantically close to the current situation based primarily on the page content the user is viewing and forms or text the user has submitted (e.g., as part of a search query). The learning-clustering module 225 and the semantic proximity calculator 230 are within a relevance engine 235. Semantic databases can be used to calculate the semantic distance of words and word groups. The learning-clustering module 225 also adds and refines scenario trigger context conditions based on usage history from the usage logs DB. For example, if a user navigates to a travel planning page even though the "planning" situation of the travel scenario was not triggered, the learning-clustering module 225 will make note of the current context and modify or add to the trigger context conditions for the planning situation. Doing so increases the probability of this situation being triggered in similar context. This can be done using a variety of machine learning and clustering algorithms, including reinforcement learning and Bayesian methods, for example.

Scenarios enable the definition of situations, which in turn describe a combination of conditions pertaining to a user's intention or implied needs. The hierarchy or taxonomy thus generated allows for a level of abstraction that is useful for catering to the user's needs and understanding the relevance of content, applications, advertisements, or items of similar importance to the user at every given point.

Previously, systems of associated keywords relating to a users search to advertising content or sponsored links which had been returned as a result of the search (e.g., Google adwords). The difference in the SDE-based system 110 is in the richness and specificity of the trigger conditions (i.e., rather than just keywords, the intention of a user can also be identified by considering the time and location, for example, of the mobile user).

The other, perhaps more profound, difference, is in the abstraction provided by the scenario-based system. In other words, rather than expressing the user's situation in a collection of keywords the user enters, the situation is identified with an abstract representation (e.g., instead of listing "hotels" and "vacation" as the trigger keywords, the advertiser can associate their ads to a situation labeled as: "user is planning a trip"). This puts the onus of identifying the trigger conditions for a situation (or the intent of the user) on the system, rather than on the advertiser, and thus greatly simplifies and optimizes the process for the advertiser. It also allows, within the abstraction hierarchy, for the system to automatically refine and improve the trigger conditions based on user behavior, and as new information sources on the status of the user or the user's context become available (e.g., user has moved to a GPS-enabled device and so the user's location can be better identified).

Content producers, application providers, advertisers, survey companies, and even the users themselves can associate their respective content to user situations by selecting a situation from a scenario. The scenario engine captures and stores such associations and it makes use of them as it is laying out the flow and page elements for the UI engine.

As an example, an advertiser may want to promote a hotel chain. Once the creative content for the advertisement is loaded on to the system, the advertiser has the option to select relevant situations from the scenarios presented by the system. In this case, the travel scenario includes the most relevant situations, and the advertiser will, for example, associate the ad to a "planning" situation. This enables the advertiser to not have to worry about all the detailed trigger context conditions that invoke a certain situation.

As stated before, each scenario is composed of various situations. Each situation has one or more conditions that evaluate to Boolean (True or False) results. The rigid situations require all conditions to evaluate to True; the fuzzy situations require one or more conditions to evaluate to True, for example. By way of further example, consider the following scenario description:

SCENARIO: Office to home commute in New York using taxis
    SITUATION 1: Rush hour with rain
        Context Parameter 1.1: Rush Hour
            Rush Hour=fuzzy (3:30 P.M. - 6:30 P.M., M - F)
        Context Parameters 1.2: Rain
            Rain=rigid (rainy weather now)
        Relevant Content:
            .Nearest taxi-stand with phone number
            Nearest store selling umbrella with directions
            Coupon for umbrella purchase
    SITUATION 2: Late but clear evening
        Context Parameter 1.1: Non-Rush Hour
            Non-Rush Hour=fuzzy (After: 6:30 P.M., M-F)
        Context Parameters 1.2: Clear Weather
            Clear Weather=fuzzy (dry and cool weather now)
        Relevant Content:
            Latest News and Sports . . . for reading during commute The scenario shown above ("Office to home commute in New York using taxis") is broken down into various situations that a commuter will encounter. Each such situation is further decomposed into context parameters, enforced as conditions for determination of a situation. For example, situation "Rush Hour" is fuzzily determined to be true if the current time is approximately ("fuzzy") between 3:30 P.M. and 6:30 P.M. from Monday through Friday. For a given situation, times "close-enough" to the rush hour time window can also be deemed by the system to be "Rush Hour". Similarly, the situation "Rain" is determined rigidly to be true if the current weather has active rainfall in the area under consideration (somewhere in New York). Assuming that the context parameters for these situations evaluate to true, the SDE-enabled system 110 proactively sends relevant content to the user in the form of nearest taxi-stand with phone number, nearest store selling umbrellas (with directions) and a coupon to be applied towards the purchase of the umbrella.

The admin interface 150 allows a user, such as a promoter, to maintain various kinds of information used in the SDE 110. For instance, a user of the admin interface 150 may define and maintain content delivered to the users. The admin interface 150 may allow a promoter to define or import value-add content, such as incentive programs (e.g., ads, coupons). Through the admin interface 150 various scenarios and situations may be defined, decomposed into context parameters according to relevance to a particular type of user (i.e., a target audience) and content. The admin interface 150 user may associate scenarios and situations to specific content (including value-add content) in user-relevant manner so that the SDE 110 delivers such content when the corresponding situations are experienced by target users. The admin interface 150 also connects to the scenarios SDK 220 for defining and using associating complex scenarios programmatically.

Figure 3:
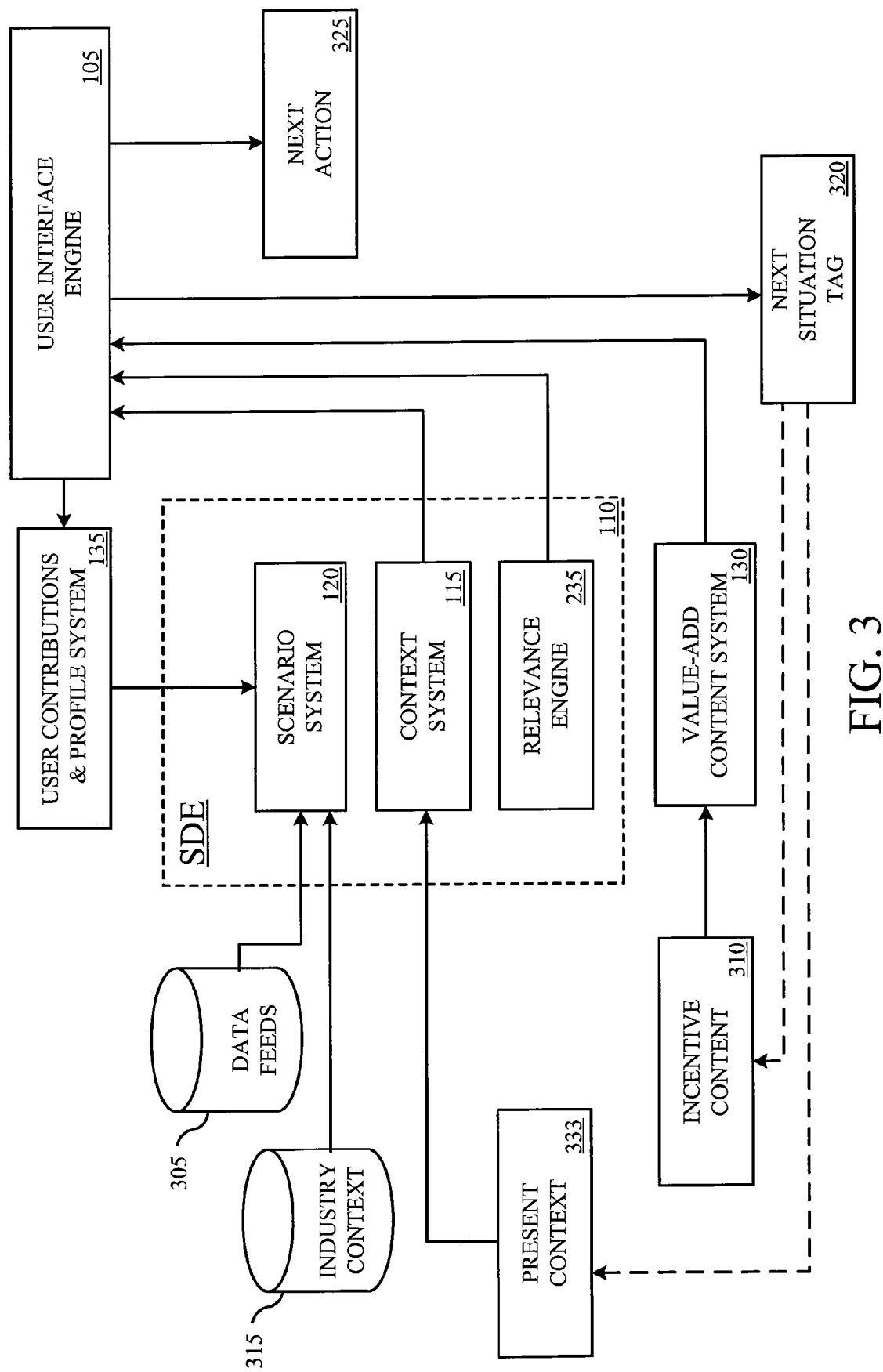
FIG. 3 is a block diagram of a system with functional representation incorporating one embodiment of the present invention.

With reference to FIG. 3, the SDE 110 takes in the current context of the user (e.g., location, velocity, time, calendar) from the context system 115 and applies that to the content to be presented to the user. An important context parameter considered by the SDE 110 is the last situation as well as the last user action in determining the most relevant content. The most relevant content is determined by predicting the next situation and user action as identified by the next situation tag 320 and the next action block 325.

The primary content presented to the new user situation comes from the external data-feeds 305, pulled in via a web-services enabled backend. However, certain types of value-add content or incentive content 310, such as incentive programs and mobile ads are also associated with the primary content. In certain cases, industry context 315 is also applied by the SDE 110, such as prior transaction history of customers for a merchant in that industry, to determine relevance. In applying the context parameters (user as well as industry), SDE 110 applies various machine learning and clustering algorithms, including reinforcement learning, or Bayesian methods for example, to determine the next situation and action.

Various embodiments of a situational decision engine, operable on a portable device, have been presented. While the invention may be described in a particular context as described in the exemplary embodiments above, further modifications and variations may be possible. The above description is therefore for illustrative purposes only and is not intended to be a limiting interpretation of the present invention. Accordingly, the scope of the present invention should not be limited by the specific embodiments described above and should instead be determined by the following claims and the full extent of their equivalents.

What is claimed is:

1. A method of inducing selection of a target situation comprising:
    acquiring a situational characteristic of a first user's general state;
    storing the situational characteristic in a computer-readable medium as an element of a computational system;
    identifying a user situation corresponding to the situational characteristic of the first user's general state;
    identifying a position in a scenario associated with the identified user situation;
    calculating a likelihood of the first user selecting a next situation in the scenario;
    evaluating a next situation with a maximal likelihood of being selected; and
    displaying, on a user-readable screen, an incentive corresponding to the next situation with the maximal likelihood of being selected.

2. The method of claim 1, further comprising:
    acquiring at least one further situational characteristic of the first user's general state;
    storing the at least one further situational characteristic in a computer-readable medium as an element of a computational system;
    defining a new situational characteristic based on combining aspects of the situational characteristic and the at least one further situational characteristic;

generating a new situation comprising the new situational characteristic; and displaying the new situation on a user-readable screen, the new situational characteristic being a component of the new situation displayed.

3. The method of claim 2, further comprising:

generating a first aspect of a trigger context associated with the new situation and corresponding to the new situational characteristic;

calculating a correspondence of the trigger context with the situational characteristic of the first users general state;

generating at least one further aspect of the trigger context based on the calculated correspondence and in association with the new situation;

evaluating a display-relevance of the new situation based on the trigger context; and displaying, on a user-readable screen, the new situation based on the display- relevance evaluation.

4. The method of claim 3, further comprising:

positioning the new situation within a scenario based on the trigger context; and measuring a semantic proximity of key words within a present display content to the new situational characteristic of the new situation.

5. The method of claim 1, further comprising inputting, by the first user, characteristics relating to a present general state.

6. The method of claim 1, further comprising:

saving a present situational characteristics of the first user as an historical situational characteristic in a database;

retrieving the historical situational characteristic of the first user from the database;

analyzing a correlation between the historical situational characteristic and a characteristic of a next situation in the scenario;

inhibiting a probability of a situation being selected by the first user;

learning an association and probability of the historical situational characteristic and a situational characteristic corresponding to a potential next situation;

producing a new situation based on learning the association of the historical situational characteristic with the potential next situation characteristic;

generating a new scenario based on the new situation produced;

evaluating a usage statistic relating to the historical situational characteristic and a transition between an associated situation; and reporting the historical situational characteristic and the usage statistic.

7. The method of claim 1, further comprising:

selecting a next page to be included within a sequence of pages presented in an application based on the identified user situation;

acquiring situational characteristics corresponding to a plurality of users;

identifying a portion of the plurality of users with a high correlation of situational characteristics with a target situation; and launching an application to the identified portion of the plurality of users.

8. The method of claim 1, further comprising:

acquiring a plurality of situational characteristics of a general state of a plurality of other user's;

evaluating a correlation of the plurality of situational characteristics with the situational characteristic of the first user's general state; and identifying one of the plurality of other users with maximal correlation of at least one situational characteristic with the user's general state.

9. The method of claim 1, further comprising:

acquiring content submitted by a second user, the content corresponding to a situation of the second users;

extracting a second-user situational characteristic corresponding to the second user's situation;

evaluating a correlation between the second-user situational characteristic and the situational characteristic of the first user's general state; and displaying the content submitted by the second user.

* * * * *